Mar. 6, 1923.
F. G. BRENDEL ET AL
1,447,707
DIMMER FOR AUTOMOBILE HEADLIGHTS
Filed Feb. 8, 1922
2 sheets-sheet 2
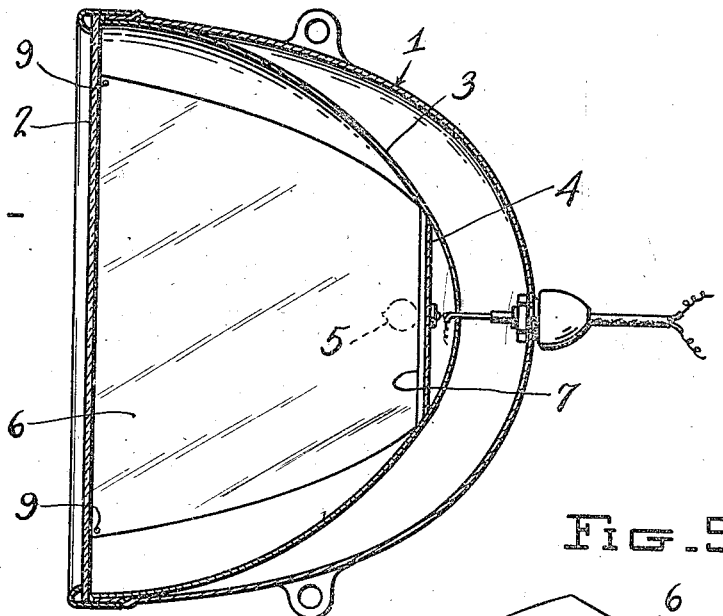
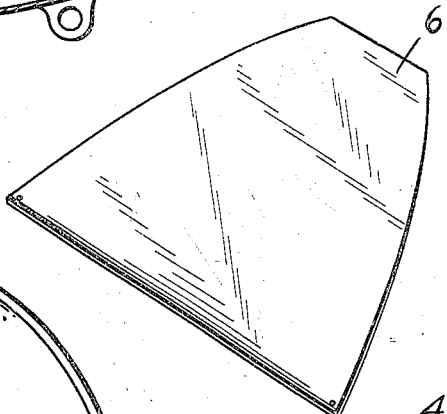
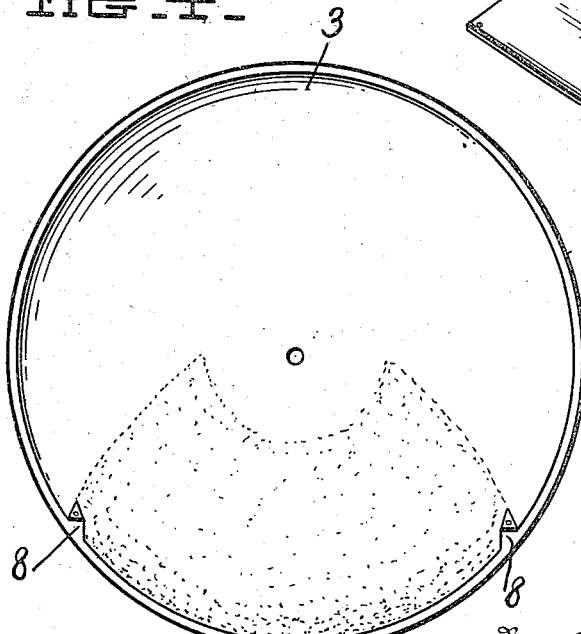
Inventors
Fred G. Brendel &
Louise M. Brendel
By L. B. James
Attorney Patented Mar. 6, 1923.

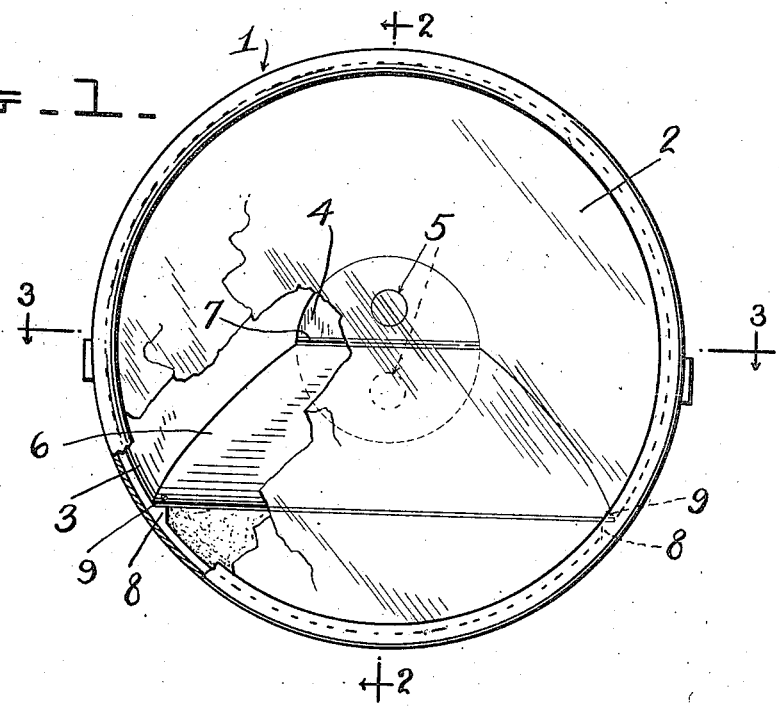
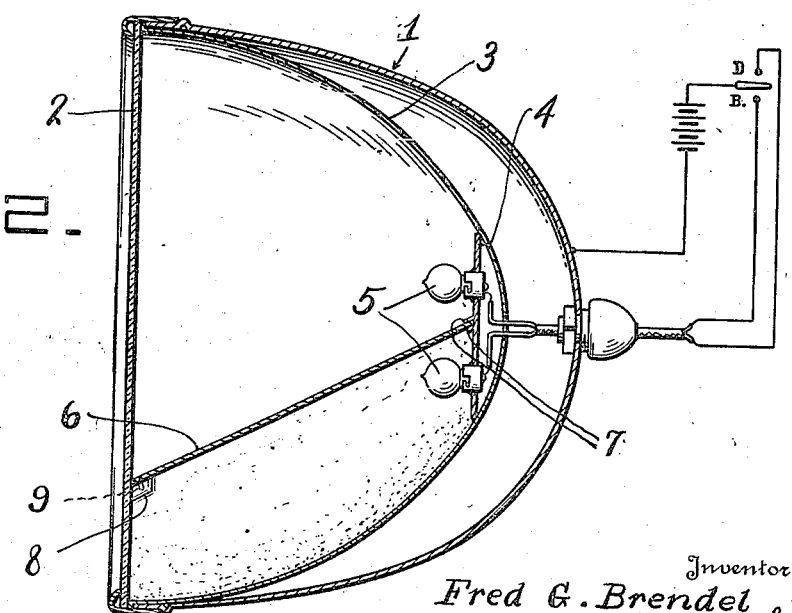

1,447,707

UNITED STATES PATENT OFFICE.

FRED GARFIELD BRENDEL AND LOUISE MARY BRENDEL, OF WHITE LAKE, MICHIGAN.

DIMMER FOR AUTOMOBILE HEADLIGHTS.

Application filed February 8, 1922. Serial No. 534,922.

*To all whom it may concern:*

Be it known that we, FRED G. BRENDEL and LOUISE M. BRENDEL, citizens of the United States, residing at White Lake, in the county of Oakland and State of Michigan, have invented new and useful Improvements in Dimmers for Automobile Headlights, of which the following is a specification.

This invention relates to lamps and more particularly to automobile headlights.

The primary object of this invention resides in the provision of an automobile headlight having a selective light deflecting area.

Another object of this invention resides in the provision of an automobile headlight of such construction that either bright or modified rays of light can be procured at the will of the driver.

A still further object of the invention resides in the provision of an automobile headlight having its deflector partitioned and treated on opposite sides of the partition to reflect light rays of different intensity.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a front view of an automobile headlight constructed in accordance with this invention.

Figure 2 is a sectional view on line 2—2 of Figure 1.

Figure 3 is a similar view on line 3—3 of Figure 2.

Figure 4 is a detail front view of the reflector.

Figure 5 is a detail perspective view of the partition.

Figure 6 is a similar view of the reflector disk.

In these views 1 indicates the casing of the lamp which is provided with the usual lens 2 at the front. A reflector 3 is arranged in the lamp and this reflector includes a disc 4 which is parallel with the lens 2 and is arranged at the rear of the reflector. This disc carries the sockets for the two lamps 5 which are arranged in different circuits so that one can be used without the other. An inclined partition plate 6 is arranged in the lamp, this plate separating the lower part of the lamp from the upper part and it is removably held in the lamp by having its rear part engaging the groove on the disc which is formed by the strips 7, suitably connected to the disc and its front end is secured to the lugs 8 by the set screws 9, the lugs 8 being connected with the front part of the reflector.

As will be seen the partition plate separates the lower part of the lamp from the upper part and a lamp bulb is located in each part. The rays of light from the lower part of the lamp will be deflected upon the road directly in front of the automobile by the partition plate while those from the upper part of the lamp will be directed quite a distance ahead of the vehicle to illuminate the road well in advance of the vehicle. The lower part of the lamp is designed for city use and is useful in passing other vehicles where there is danger of blinding the driver by the rays from the major part of the lamp. The portions of the reflector and disc below the partition plate are provided with a dull finish so as to provide a dim light from this part of the lamp.

From the above it will be seen that our lamp can be used for both city and country use and the partition plate can easily be moved when desired or necessary.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

In an automobile headlight, a reflector, a plate at the rear end of said reflector, a pair of spaced ribs extending transversely across the front face of said plate, lugs at the front of said reflector and disposed on opposite sides thereof in alinement with each other, a partition plate having its rear edge received between said ribs and its front corners resting on said lugs, said partition plate being inclined downwardly at the front and having said front corners secured to said lugs, the reflector below the partition plate having its surface dulled, and lamps arranged one above and one below the partition plate and carried by the rear plate.

In testimony whereof we affix our signatures.

FRED GARFIELD BRENDEL.
LOUISE MARY BRENDEL.